(12) United States Patent
Scherr

(10) Patent No.: US 10,700,848 B2
(45) Date of Patent: *Jun. 30, 2020

(54) SENSOR THAT TRANSMITS SIGNALS RESPONSIVE TO A REQUEST SIGNAL AND RECEIVES INFORMATION

(71) Applicant: Infineon Technologies AG, Neubiberg (DE)

(72) Inventor: Wolfgang Scherr, Villach/Landskron (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/499,383

(22) Filed: Apr. 27, 2017

(65) Prior Publication Data

US 2017/0230168 A1 Aug. 10, 2017

Related U.S. Application Data

(63) Continuation of application No. 14/186,307, filed on Feb. 21, 2014, now Pat. No. 9,667,409, which is a continuation of application No. 14/010,353, filed on Aug. 26, 2013, now Pat. No. 8,922,331, which is a continuation of application No. 13/444,023, filed on Apr. 11, 2012, now Pat. No. 8,519,819, which is a continuation of application No. 11/838,475, filed on Aug. 14, 2007, now Pat. No. 8,183,982.

(51) Int. Cl.
*H04L 7/06* (2006.01)
*H04L 5/14* (2006.01)
*H04L 7/04* (2006.01)
*H04L 25/49* (2006.01)
*H04L 7/00* (2006.01)

(52) U.S. Cl.
CPC .............. *H04L 7/06* (2013.01); *H04L 5/1484* (2013.01); *H04L 7/00* (2013.01); *H04L 7/044* (2013.01); *H04L 25/4902* (2013.01)

(58) Field of Classification Search
CPC ...... H03M 1/12; H03M 1/1245; H03M 1/002; H03M 1/66; H03M 3/458; H03M 7/30; H03M 1/122; H03M 1/123; H03M 1/38; H03M 1/46; H03M 1/001; H03M 1/0617; H03M 1/1009

See application file for complete search history.

(56) References Cited

U.S. PATENT DOCUMENTS

| | | | |
|---|---|---|---|
| 3,573,626 A | 4/1971 | Ertman | |
| 3,895,383 A | 7/1975 | Korman | |
| 4,121,217 A | 10/1978 | Chen | |
| 4,415,896 A | 11/1983 | Allgood | |
| 4,423,655 A * | 1/1984 | Turner | G10H 1/04 84/620 |
| 4,517,561 A | 5/1985 | Burke et al. | |
| 4,536,748 A | 8/1985 | Tonello | |

(Continued)

*Primary Examiner* — Joseph H Feild
*Assistant Examiner* — Rufus C Point
(74) *Attorney, Agent, or Firm* — Schiff Hardin LLP

(57) ABSTRACT

A sensor comprises a transmitter to transmit signals over a communication path, the sensor further capable to receive signals from the communication path, wherein the sensor is configured to communicate sensor data having a nibble data signal format at the transmitter in response to a trigger signal received at the sensor.

22 Claims, 4 Drawing Sheets

(56) References Cited

U.S. PATENT DOCUMENTS

| | | | |
|---|---|---|---|
| 4,564,838 A | 1/1986 | Boulogne et al. | |
| 4,587,651 A * | 5/1986 | Nelson | H04L 12/42 370/405 |
| 4,608,560 A | 8/1986 | Allgood | |
| 4,677,608 A | 6/1987 | Forsberg | |
| 4,714,923 A | 12/1987 | Tassle et al. | |
| 4,797,574 A | 1/1989 | Okubo et al. | |
| 4,799,218 A | 1/1989 | Sakagami et al. | |
| 4,804,954 A | 2/1989 | Macnak et al. | |
| 4,839,642 A | 6/1989 | Batz et al. | |
| 4,839,645 A | 6/1989 | Lill | |
| 4,845,486 A * | 7/1989 | Knight | G01F 23/36 340/618 |
| 4,875,096 A | 10/1989 | Baer et al. | |
| 4,881,072 A | 11/1989 | Carnel | |
| 4,916,642 A | 4/1990 | Kaiser et al. | |
| 4,970,506 A | 11/1990 | Sakaida et al. | |
| 5,063,574 A * | 11/1991 | Moose | H04L 27/2602 375/244 |
| 5,117,424 A | 5/1992 | Cohen et al. | |
| 5,126,587 A | 6/1992 | Preller et al. | |
| 5,144,265 A | 9/1992 | Petzold | |
| 5,153,583 A | 10/1992 | Murdoch | |
| 5,182,943 A * | 2/1993 | Fukui | F02D 41/009 73/114.27 |
| 5,198,810 A | 3/1993 | Harel | |
| 5,204,986 A | 4/1993 | Ito et al. | |
| 5,222,105 A * | 6/1993 | Kinney | H03M 5/12 341/70 |
| 5,249,364 A * | 10/1993 | Bishop | G01B 5/255 33/193 |
| 5,283,571 A | 2/1994 | Yang et al. | |
| 5,355,130 A | 10/1994 | Luber | |
| 5,357,141 A * | 10/1994 | Nitschke | B60R 16/0315 280/735 |
| 5,365,516 A | 11/1994 | Jandrell | |
| 5,446,759 A * | 8/1995 | Campana, Jr. | H04B 7/10 375/267 |
| 5,448,221 A | 9/1995 | Weller | |
| 5,450,071 A | 9/1995 | DeLuca et al. | |
| 5,471,187 A | 11/1995 | Hansen et al. | |
| 5,579,060 A * | 11/1996 | Elberbaum | G11B 27/028 348/705 |
| 5,621,735 A | 4/1997 | Rochester, Jr. et al. | |
| 5,684,828 A * | 11/1997 | Bolan | G06F 3/0383 340/10.2 |
| 5,712,784 A | 1/1998 | Fendt et al. | |
| 5,722,081 A | 2/1998 | Tamura | |
| 5,745,049 A | 4/1998 | Akiyama et al. | |
| 5,760,705 A | 6/1998 | Glessner et al. | |
| 5,852,609 A * | 12/1998 | Adams, III | H04L 47/10 370/465 |
| 5,978,927 A * | 11/1999 | Curry | G06F 13/4213 710/60 |
| 6,002,882 A * | 12/1999 | Garde | G06F 13/4291 370/439 |
| 6,054,920 A * | 4/2000 | Smith | G08B 25/10 340/506 |
| 6,112,275 A * | 8/2000 | Curry | G01K 1/028 711/100 |
| 6,130,905 A * | 10/2000 | Wakayama | H04B 1/713 370/468 |
| 6,167,466 A | 12/2000 | Nguyen et al. | |
| 6,230,096 B1 * | 5/2001 | Nishimoto | F02D 41/009 701/113 |
| 6,273,218 B1 * | 8/2001 | Kramer | F16D 51/22 188/1.11 L |
| 6,340,932 B1 | 1/2002 | Rodgers et al. | |
| 6,385,208 B1 * | 5/2002 | Findlater | H04L 7/0008 370/401 |
| 6,608,571 B1 * | 8/2003 | Delvaux | G06F 13/4295 341/53 |
| 6,625,553 B1 * | 9/2003 | Modgil | B60R 25/04 307/10.7 |
| 6,633,753 B1 | 10/2003 | Kido | |
| 6,738,364 B1 | 5/2004 | Saunders | |
| 6,765,484 B2 | 7/2004 | Eagleson et al. | |
| 6,952,160 B1 * | 10/2005 | Bennie | B60C 23/0408 340/309.16 |
| 6,980,086 B2 * | 12/2005 | Papp | B60R 25/24 340/10.1 |
| 7,106,793 B2 | 9/2006 | Spichale | |
| 7,202,772 B2 | 4/2007 | Emmerling et al. | |
| 7,349,511 B2 | 3/2008 | Wendorff | |
| 7,633,378 B2 | 12/2009 | Rodgers et al. | |
| 7,811,231 B2 | 10/2010 | Jin et al. | |
| 7,853,210 B2 | 12/2010 | Meyers et al. | |
| 8,013,732 B2 | 9/2011 | Petite et al. | |
| 8,065,455 B2 * | 11/2011 | Hilscher | H04L 12/407 710/104 |
| 8,183,982 B2 * | 5/2012 | Scherr | H04L 5/1484 340/10.3 |
| 9,210,015 B2 * | 12/2015 | Scherr | H04L 25/4902 |
| 9,397,871 B2 * | 7/2016 | Rasbornig | H04L 25/4902 |
| 2001/0010187 A1 * | 8/2001 | Ishii | G10H 1/0066 84/609 |
| 2002/0021351 A1 * | 2/2002 | Shinohara | G06K 15/1219 347/235 |
| 2002/0064133 A1 | 5/2002 | Chen et al. | |
| 2002/0111756 A1 * | 8/2002 | Modgil | B60R 25/04 702/63 |
| 2003/0030542 A1 | 2/2003 | von Hoffmann | |
| 2003/0030565 A1 * | 2/2003 | Sakatani | G01H 1/003 340/679 |
| 2003/0219014 A1 | 11/2003 | Kotabe et al. | |
| 2003/0235216 A1 * | 12/2003 | Gustin | H04J 3/0697 370/509 |
| 2004/0083833 A1 | 5/2004 | Hitt et al. | |
| 2004/0100394 A1 | 5/2004 | Hitt | |
| 2004/0174933 A1 | 9/2004 | Lei | |
| 2004/0186365 A1 * | 9/2004 | Jin | A61B 5/0002 600/365 |
| 2004/0234000 A1 * | 11/2004 | Page | H04J 3/00 375/259 |
| 2004/0246117 A1 * | 12/2004 | Ogawa | B60C 23/0408 340/445 |
| 2004/0260463 A1 | 12/2004 | Hathiram et al. | |
| 2004/0263351 A1 | 12/2004 | Joy et al. | |
| 2005/0052282 A1 | 3/2005 | Rodgers et al. | |
| 2005/0200464 A1 * | 9/2005 | Bennie | B60C 23/0408 340/442 |
| 2005/0213693 A1 * | 9/2005 | Page | H04L 7/0008 375/354 |
| 2005/0225426 A1 | 10/2005 | Yoon et al. | |
| 2005/0252979 A1 | 11/2005 | Konuma et al. | |
| 2005/0283209 A1 | 12/2005 | Katoozi et al. | |
| 2006/0010961 A1 * | 1/2006 | Gibson | B60C 23/0408 73/40 |
| 2006/0056370 A1 | 3/2006 | Hancock et al. | |
| 2006/0103506 A1 | 5/2006 | Rodgers et al. | |
| 2006/0113960 A1 | 6/2006 | Thulesius et al. | |
| 2006/0161301 A1 | 7/2006 | Kim | |
| 2006/0198355 A1 | 9/2006 | Hagiwara | |
| 2006/0247505 A1 | 11/2006 | Siddiqui | |
| 2007/0152812 A1 * | 7/2007 | Wong | A61B 5/0002 340/539.12 |
| 2007/0194942 A1 * | 8/2007 | Darr | H02H 1/0061 340/635 |
| 2007/0210916 A1 | 9/2007 | Ogushi et al. | |
| 2007/0262872 A1 | 11/2007 | Carrender et al. | |
| 2007/0290836 A1 | 12/2007 | Ainsworth et al. | |
| 2008/0074263 A1 | 3/2008 | Rofougaran et al. | |
| 2008/0107188 A1 * | 5/2008 | Kennedy | H04B 1/7163 375/259 |
| 2008/0129505 A1 | 6/2008 | Lin et al. | |
| 2008/0150698 A1 | 6/2008 | Smith et al. | |
| 2008/0310571 A1 * | 12/2008 | Warren | H04L 25/4902 375/360 |
| 2008/0312860 A1 | 12/2008 | Bauerle | |

(56) References Cited

U.S. PATENT DOCUMENTS

| | | |
|---|---|---|
| 2009/0046773 A1 | 2/2009 | Scherr |
| 2009/0051554 A1* | 2/2009 | Jarvie .................... B65D 88/76 |
| | | 340/622 |
| 2009/0119437 A1* | 5/2009 | Hilscher ............... H04L 12/407 |
| | | 710/305 |
| 2009/0215424 A1 | 8/2009 | Petite |
| 2009/0243840 A1 | 10/2009 | Petite et al. |
| 2010/0176931 A1* | 7/2010 | Bennett ................ H04L 12/403 |
| | | 340/10.4 |
| 2010/0194582 A1 | 8/2010 | Petite |
| 2011/0014199 A1 | 1/2011 | Fung et al. |
| 2012/0013257 A1 | 1/2012 | Sibert |
| 2012/0081757 A1* | 4/2012 | Komiya ............ H04N 1/00687 |
| | | 358/296 |
| 2016/0050089 A1* | 2/2016 | Strasser ................. H04L 67/10 |
| | | 375/238 |
| 2016/0057510 A1* | 2/2016 | Hammerschmidt .... H04L 69/18 |
| | | 340/870.01 |
| 2016/0094370 A1* | 3/2016 | Rasbornig ........... H04L 25/4902 |
| | | 375/238 |
| 2016/0294534 A1* | 10/2016 | Kozawa .................... H04L 5/00 |
| 2016/0330051 A1* | 11/2016 | Rasbornig ........... H04L 25/4902 |

\* cited by examiner

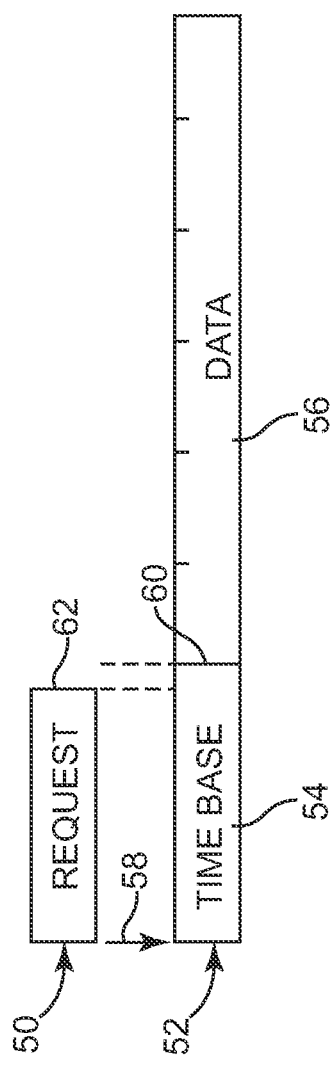
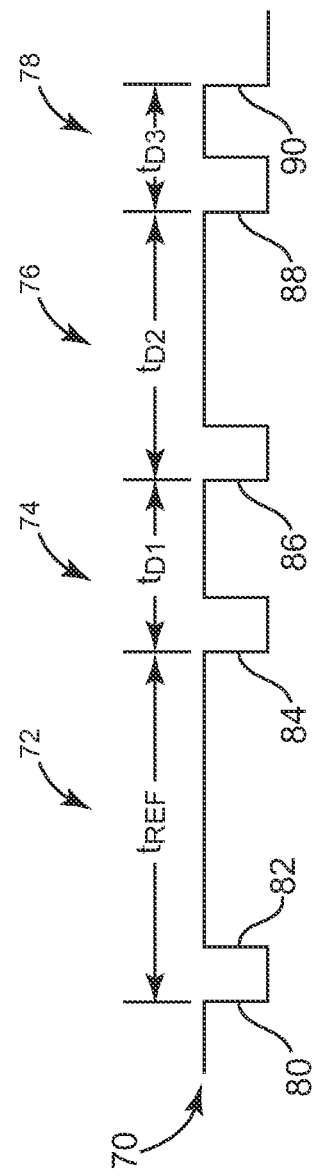

SENSOR THAT TRANSMITS SIGNALS RESPONSIVE TO A REQUEST SIGNAL AND RECEIVES INFORMATION

CROSS-REFERENCE TO RELATED APPLICATIONS

This continuation application is a continuation of U.S. patent application Ser. No. 14/010,353 filed on Aug. 26, 2013 which is a continuation of U.S. patent application Ser. No. 13/444,023 filed on Apr. 11, 2012 now U.S. Pat. No. 8,519,819 which is a continuation of U.S. patent application Ser. No. 11/838,475 now U.S. Pat. No. 8,183,982 and claims the benefit of the priority date of the above application, the contents of which are herein incorporated in its full entirety by reference.

BACKGROUND

Typically, an electrical system includes a number of different components that communicate with one another to perform system functions. The different components may be situated on the same integrated circuit chip or on different integrated circuit chips. Usually, an electrical system, such as the electrical system in an automobile, includes one or more controllers, memory chips, sensor circuits, and actor circuits. The controller digitally communicates with the memory chips, sensors, and actors to control operations in the automobile.

In digital communications a common time base is used to transmit and receive data. The common time base needs to be provided to each of the components and can be provided to each of the components via an explicit clock signal or by combining the time base with the transmitted data. A transmitter transmits data via the common time base and a receiver receives and decodes the data via the common time base. The received data cannot be properly decoded without the common time base.

Another aspect of digital communications includes the start time of a data transmission. If the transmission start time is not coded on the common time base signal or in the data, another signal line is used to indicate the start of a data transmission. Many embedded systems include a common system clock and selection signals that select system components and indicate the start of data transmissions.

Often, in decentralized systems, a multi-wire communication system, such as a serial peripheral interface (SPI), is used. Typically, a master provides a clock signal and a slave select signal to each component via separate signal lines. The master toggles the clock signal coincident with transmitted data and the slave select signals select components and indicate the beginning and/or end of a data transmission. In operation of an SPI system, the master configures the clock signal to a frequency that is less than or equal to the maximum frequency of a slave and pulls the slave's select line low. The master selects one slave at a time. If a waiting period is required, the master waits for the waiting period before issuing clock cycles. During each clock cycle a full duplex data transmission occurs, where the master sends a bit on one line and the slave reads the bit from the one line and the slave sends a bit on another line and the master reads the bit from the other line. Transmissions include any number of clock cycles and when there are no more data to be transmitted, the master deselects the slave and stops toggling the clock signal.

Separate clock and select signal lines to each of the components can be used to provide bus ability. In addition, in these systems the masters can send data to the slaves. However, separate signal lines increase costs and manufacturers want to reduce costs.

To avoid using a separate clock line, the time base can be encoded into the data. For example, Manchester encoding is a bit-synchronous transmission method where data is transmitted bit by bit using a given bit rate. In Manchester encoding, each bit is represented by either a rising edge or a falling edge of an electrical signal, where the rising edge represents one of a logical one or a logical zero and the falling edge represents the other one of a logical one or a logical zero. Between bits the electrical signal may need to transition to transfer the next bit and it is necessary to distinguish between edges that represent bits and edges that are signal changes between bits. This is achieved by starting the transmission with a known bit sequence, referred to as a preamble. However, the preamble mechanism is for only a one-way transmission and the receiver is not able to control the start time of the transmission. Also, the transmission requires twice the frequency of the bit rate and high frequencies introduce electromagnetic interference (EMI) problems. In addition, dedicated circuits are needed, since it is difficult to encode and decode the data using typical peripheral elements found on embedded controllers.

For these and other reasons there is a need for the present invention.

SUMMARY

According to one aspect, a sensor comprises a transmitter to transmit signals over a communication path, the sensor further capable to receive signals from the communication path, wherein the sensor is configured to communicate sensor data having a nibble data signal format at the transmitter in response to a trigger signal received at the sensor.

According to a further aspect, a sensor comprises a transmitter to transmit signals over a communication path, the sensor further comprising circuitry to receive signals from the communication path, wherein the sensor is configured to communicate sensor data over a communication path by transmitting a pulse width modulated data signal in response to a trigger signal which is received at the sensor.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 2 is a block diagram illustrating a request signal and a reply signal in one embodiment of an electrical system.

FIG. 3 is a diagram illustrating a reply signal that is transmitted via one embodiment of a transmitter.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
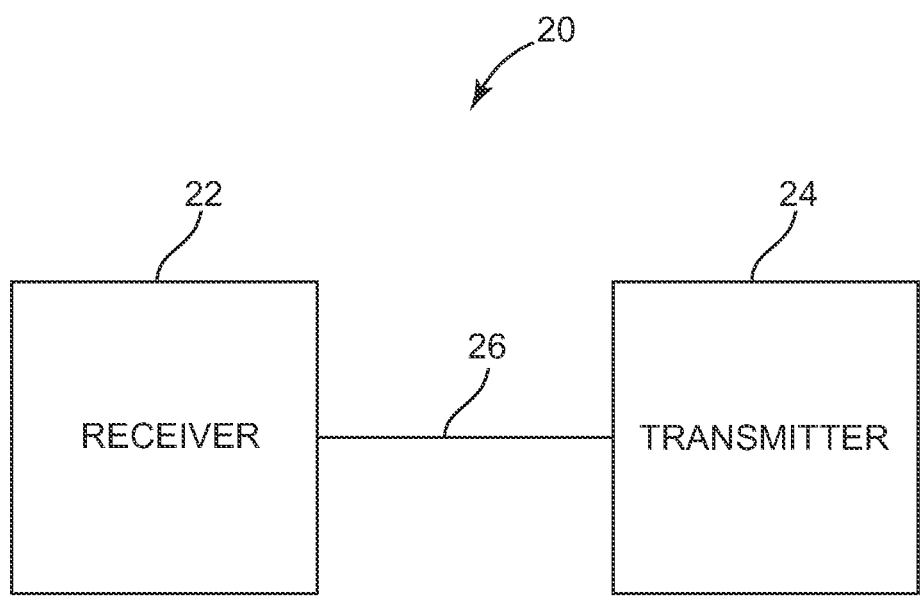
FIG. 1 is a diagram illustrating one embodiment of an electrical system according to the present invention.

FIG. 1 is a diagram illustrating one embodiment of an electrical system 20 according to the present invention. In one embodiment, system 20 is part of an automobile's electrical system.

System 20 includes a receiver 22 and a transmitter 24. Receiver 22 is communicatively coupled to transmitter 24 via one or more communication paths at 26. In one embodiment, receiver 22 is part of one integrated circuit chip and transmitter 24 is part of another integrated circuit chip. In one embodiment, receiver 22 and transmitter 24 are part of the same integrated circuit chip. In one embodiment, receiver 22 is a controller. In one embodiment, transmitter 24 is a sensor, such as an automobile sensor. In one embodiment, transmitter 24 is an actor, such as a relay circuit. In one embodiment, transmitter 24 is a controller. In other embodiments, receiver 22 and transmitter 24 are any suitable components.

Receiver 22 transmits a request signal to transmitter 24 via one of the communication paths at 26 and transmitter 24 transmits a reply signal to receiver 22 via one of the communication paths at 26. The reply signal includes a synchronization signal that indicates the time base of transmitter 24 and data. The request signal and the reply signal overlap in time, where at least a portion of the request signal occurs at the same time as at least a portion of the reply signal. In one embodiment, the request signal and the synchronization signal overlap in time, where at least a portion of the request signal occurs at the same time as at least a portion of the synchronization signal.

Transmitter 24 transmits data correlated to the time base of transmitter 24, where the length of the synchronization signal indicates the time base of transmitter 24 and the length of each data signal represents data bits. In one embodiment, each data signal represents a nibble of data, i.e. four data bits.

Receiver 22 receives the synchronization signal and measures the length of the synchronization signal to obtain the time base of transmitter 24. Based on the received time base, receiver 22 recovers data bit information from the data signals via measuring the length of the data signals and comparing the measured length to the received time base of transmitter 24. In one embodiment, the request signal includes a trigger signal and transmitter 24 starts the reply signal in response to the trigger signal. In one embodiment, the request signal includes a trigger signal and transmitter 24 starts the synchronization signal in response to the trigger signal. In one embodiment, the request signal includes a trigger signal and the length of the synchronization signal is measured from the trigger signal to the end of the synchronization signal provided via transmitter 24.

In one embodiment, receiver 22 transmits one or more commands and/or data to transmitter 24 in the request signal. In one embodiment, the request signal includes one or more transmitter identification values to select one or more of multiple transmitters, which provides bus ability in system 20. In one embodiment, the request signal includes data request parameters, such as sensor measurement range information that directs the transmitter to switch to a different sensor measurement range or transmit data in the specified sensor measurement range. In one embodiment, the request signal includes configurable parameters, such as relay turn-on/off time that directs a relay to remain on/off for a specified time. In one embodiment, the request signal includes commands, such as a self-test signal that directs the transmitter to perform a self-test or a memory test. In one embodiment, the request signal includes a wake-up signal that powers up the transmitter from a sleep mode or power down mode. In one embodiment, the request signal includes a power down signal to power down the transmitter or put the transmitter in a power saving sleep mode. In one embodiment, the request signal includes a send data and remain powered-up signal. In one embodiment, the request signal includes a send data and power down signal.

In one embodiment, receiver 22 transmits a request and transmitter 24 transmits a pulse width modulated reply signal that includes a synchronization pulse followed by one or more data pulses. The synchronization pulse is the synchronization signal, where the length of the synchronization pulse represents the time base, i.e. clock speed, of transmitter 24. Each of the data pulses represents one or more data bits of information, such as transmitter status, transmitter data, and checksum information. The request signal overlaps in time the pulse width modulated reply signal and the synchronization signal. Receiver 22 receives the pulse width modulated reply signal and measures the lengths of the synchronization pulse and the data pulses to recover data bit information.

Receiver 22 transmits the request via one of the communication paths 26 and transmitter 24 transmits the reply signal via one of the communication paths 26. In one embodiment, receiver 22 and transmitter 24 are communicatively coupled via one or more conductive lines, where each of the conductive lines is a communications path. In one embodiment, receiver 22 and transmitter 24 are communicatively coupled via one or more radio frequency (RF) frequencies, where each of the RF frequencies is a communications path. In one embodiment, receiver 22 and transmitter 24 are communicatively coupled via one or more optical wavelengths, where each wavelength (color) is a communications path. In one embodiment, receiver 22 and transmitter 24 are communicatively coupled via magnetic signals. In one embodiment, receiver 22 and transmitter 24 are communicatively coupled via pressure signals.

In one embodiment, receiver 22 transmits the request via one communications path and transmitter 24 transmits the reply signal via the same communications path. In one embodiment, receiver 22 transmits the request via a first communications path and transmitter 24 transmits the reply signal via a second communications path.

Receiver 22 and transmitter 24 communicate to send a request signal from receiver 22 to transmitter 24 and a reply signal from transmitter 24 to receiver 22. In other embodiments, receiver 22 is configured to send a request signal from receiver 22 to transmitter 24 and a reply signal from receiver 22 to transmitter 24, and transmitter 24 is configured to send a request signal from transmitter 24 to receiver 22 and a reply signal from transmitter 24 to receiver 22.

System 20 provides data communications between receiver 22 and transmitter 24 via a single communications path, such as one conductive line, or two communication paths, such as two conductive lines. These data communications have a high tolerance to time base differences between receiver 22 and transmitter 24. Also, the request signal and the synchronization signal provide synchronization of the data communications and the request signal provides for the transmission of commands and/or data from receiver 22 to transmitter 24. In addition, the request signal can include transmitter identifications that can be used in communications from a receiver to multiple transmitters, i.e. bus ability.

FIG. 2 is a block diagram illustrating a request signal 50 and a reply signal 52 in one embodiment of system 20. Reply signal 52 includes a synchronization signal 54 and data signals 56. Synchronization signal 54 is a time base signal that indicates the time base of transmitter 24. Each of the data signals 56 is correlated to the time base indicated via synchronization signal 54.

Receiver 22 transmits request signal 50 to transmitter 24 via one of the communication paths 26 and transmitter 24 transmits reply signal 52 to receiver 22 via one of the communication paths 26. In response to a trigger signal at 58 in request signal 50, transmitter 24 starts synchronization signal 54. After reaching a pre-determined internal count value, transmitter 24 transmits a trailing edge at 60 in synchronization signal 54. The length of synchronization signal 54, from trigger signal 58 to trailing edge 60, indicates the time base or clocking speed of transmitter 24. In one embodiment, transmitter 24 uses the indicated time base to transmit data signals 56, which correlates data signals 56 to the time base indicated by synchronization signal 54.

Receiver 22 transmits the remainder of request signal 50 after trigger signal 58. The remainder of request signal 50 includes any commands and/or data to be transmitted to transmitter 24, such as transmitter identification values, data request parameters such as a sensor measurement range, configurable parameters such as a relay turn-on/off time, and commands such as a self-test signal, a wake-up signal, a power down signal, a send data and remain powered-up signal, or a send data and power down signal. Request signal 50 overlaps in time at least a portion of synchronization signal 54 and if receiver 22 and transmitter 24 transmit via the same communications path, a trailing edge at 62 in request signal 50 occurs before the trailing edge 60 of synchronization signal 54 is transmitted via transmitter 24 on the same communications path. If receiver 22 and transmitter 24 transmit via different communication paths, the trailing edge 62 of request signal 50 can occur before or after the trailing edge 60 of synchronization signal 54 is transmitted via transmitter 24.

In one embodiment, receiver 22 is electrically coupled to transmitter 24 via one or more conductive lines and receiver 22 transmits request signal 50 on a first conductive line via voltage signals, such as voltage pulses or voltage bursts. Voltage signals on the first conductive line is a communications path. Request signal information is coded into the amplitude and/or length of the voltage pulses or coded into the amplitude, length, and/or frequency of the voltage bursts. Transmitter 24 transmits reply signal 52 via voltage signals, such as a pulse width modulated voltage signal, voltage pulses, or voltage bursts. Where leading and trailing edge information of synchronization signal 54 and data signals 56 are coded into the amplitude and/or length of the voltage pulses or the amplitude, length, and/or frequency of the voltage bursts. Receiver 22 and transmitter 24 generate the voltage signals via suitable circuitry, such as level-switching power stages, operational amplifiers, resistor networks, or open-drain/open-collector interfaces including pull-ups. Also, receiver 22 and transmitter 24 receive the voltage signals via suitable circuitry, such as window-detectors, schmitt-triggers, or open-drain/open-collector interfaces including pull-ups. If transmitter 24 transmits reply signal 52 via the first conductive line, request signal 50 and reply signal 52 share the same communications path and request signal 50 ends before the trailing edge 60 of synchronization signal 54. If transmitter 24 transmits reply signal 52 via a second conductive line, request signal 50 and reply signal 52 do not share the same communications path and request signal 50 can end before or after the trailing edge 60 of synchronization signal 54.

In one embodiment, receiver 22 is electrically coupled to transmitter 24 via a conductive line and receiver 22 transmits request signal 50 on the conductive line via voltage signals, such as voltage pulses or voltage bursts. The voltage signals on the conductive line are a first communications path. Request signal information is coded into the amplitude and/or length of the voltage pulses or coded into the amplitude, length, and/or frequency of the voltage bursts. Transmitter 24 transmits reply signal 52 via current signals, such as current pulses or current bursts, where leading and trailing edge information of synchronization signal 54 and data signals 56 are coded into the amplitude and/or length of the current pulses or the amplitude, length, and/or frequency of the current bursts. The current pulses on the conductive line are a second communications path, such that request signal 50 and reply signal 52 do not share the same communications path and request signal 50 can end before or after the trailing edge 60 of synchronization signal 54.

In one embodiment, receiver 22 is communicatively coupled to transmitter 24 via antennae and one or more RF frequencies and receiver 22 transmits request signal 50 via a first RF frequency. The first RF frequency is a first communications path and request signal 50 is coded into the amplitude, length, and/or frequency of the RF signal or coded into the frequency/modulation factor, length, or amplitude of an RF modulated signal. Transmitter 24 transmits reply signal 52 via an RF frequency, where leading and trailing edges of synchronization signal 54 and data signals 56 are coded into the amplitude, length, and/or frequency of the RF signal or coded into the frequency/modulation factor, length, or amplitude of an RF modulated signal. If transmitter 24 transmits reply signal 52 via the first RF frequency, request signal 50 and reply signal 52 share the same communications path and request signal 50 ends before the trailing edge 60 of synchronization signal 54. If transmitter 24 transmits reply signal 52 via a second RF frequency, request signal 50 and reply signal 52 do not share the same communications path and request signal 50 can end before or after the trailing edge 60 of synchronization signal 54.

In one embodiment, receiver 22 is communicatively coupled to transmitter 24 via an optical coupling, such as LED's or glass fibre, and one or more wavelengths (color). Receiver 22 transmits request signal 50 via a first wavelength, which is one communications path. Request signal 50 is coded into the amplitude, length, intensity, and/or burst frequency of the optical signal. Transmitter 24 transmits reply signal 52 via an optical wavelength, where leading and trailing edges of synchronization signal 54 and data signals 56 are coded into the amplitude, length, intensity, and/or burst frequency of the optical signal. If transmitter 24 transmits reply signal 52 via the first wavelength, request signal 50 and reply signal 52 share the same communications path and request signal 50 ends before the trailing edge 60 of synchronization signal 54. If transmitter 24 transmits reply signal 52 via a second wavelength, request signal 50 and reply signal 52 do not share the same communications path and request signal 50 can end before or after the trailing edge 60 of synchronization signal 54.

In one embodiment, receiver 22 is communicatively coupled to transmitter 24 via a magnetic coupling, such as a coil, Receiver 22 transmits request signal 50 via the magnetic coupling, which is one communications path. Request signal 50 is coded into the amplitude, length, intensity, and/or frequency of the magnetic signal. Transmitter 24 transmits reply signal 52 via the magnetic coupling, where leading and trailing edges of synchronization signal 54 and data signals 56 are coded into the amplitude, length, intensity, and/or frequency of the magnetic signal. Request signal 50 and reply signal 52 share the same communications path and request signal 50 ends before the trailing edge 60 of synchronization signal 54.

In one embodiment, receiver 22 is communicatively coupled to transmitter 24 via a pressure coupling, such as piezo actor/sensor combinations or loudspeaker/microphone combinations. Receiver 22 transmits request signal 50 via the pressure coupling, which is one communications path. Request signal 50 is coded into the amplitude, length, intensity, and/or frequency of the pressure pulse signal. Transmitter 24 transmits reply signal 52 via the pressure coupling, where leading and trailing edges of synchronization signal 54 and data signals 56 are coded into the amplitude, length, intensity, and/or frequency of the pressure pulse signal. Request signal 50 and reply signal 52 share the same communications path and request signal 50 ends before the trailing edge 60 of synchronization signal 54.

In other embodiments, receiver 22 and transmitter 24 are suitably communicatively coupled. If they share the same communications channel or path, request signal 50 ends before the trailing edge 60 of synchronization signal 54. If they do not share the same communications channel or path, request signal 50 ends before or after the trailing edge 60 of synchronization signal 54.

In another embodiment of system 20, the synchronization signal is transmitted between data signals. Transmitter 24 starts transmitting data signals in response to a trigger signal in the request signal. Next, transmitter 24 transmits a synchronization signal and the remainder of the data signals. Some of the data signals are received and stored in receiver 22 prior to receiving the synchronization signal. The stored data signals are decoded after the synchronization signal is received from transmitter 24. Also, at least a portion of the request signal overlaps in time at least a portion of the reply signal and one or more data signals.

In another embodiment of system 20, the synchronization signal is transmitted after the data signals. Transmitter 24 starts transmitting data signals in response to a trigger signal in the request signal. After transmitting the data signals, transmitter 24 transmits a synchronization signal. The data signals are received and stored in receiver 22 and decoded after the synchronization signal is received from transmitter 24. Also, at least a portion of the request signal overlaps in time at least a portion of the reply signal and one or more data signals.

FIG. 3 is a diagram illustrating a reply signal 70 that is transmitted via one embodiment of transmitter 24. Reply signal 70 includes synchronization signal 72, data signal D1 at 74, data signal D2 at 76, and data signal D3 at 78. The data signals D1 at 74, D2 at 76, and D3 at 78 include transmitter information, such as transmitter status, data, and checksum information. Each of the data signals D1 at 74, D2 at 76, and D3 at 78 represents one or more data bits. Synchronization signal 72 provides a reference time tREF at 72 that indicates the time base of transmitter 24. Each of the data signal times tD1 at 74, tD2 at 76, and tD3 at 78 correlates to reference time tREF at 72. In one embodiment, each of the data signals D1 at 74, D2 at 76, and D3 at 78 represents a nibble of data, i.e. four data bits.

Receiver 22 transmits a request signal (not shown) to transmitter 24 via one of the communication paths 26. In response to a trigger signal in the request signal, transmitter 24 provides a falling edge signal at 80 and a rising edge signal at 82 in synchronization signal 72. After reaching a reference count, transmitter 24 transmits a trailing falling edge signal at 84. The length of synchronization signal 72, from the falling edge at 80 to the falling edge at 84 is reference time tREF at 72. Synchronization signal 72 is made to be distinguishable from each of the data signals D1 at 74, D2 at 76, and D3 at 78. In one embodiment, reference time tREF at 72 is the longest pulse width that can be provided via transmitter 24. In one embodiment, reference time tREF at 72 is the shortest pulse width that can be provided via transmitter 24.

Receiver 22 transmits the remainder of the request signal after the falling edge at 80. The remainder of the request signal includes any commands and/or data to be transmitted to transmitter 24. The request signal overlaps in time at least a portion of synchronization signal 72. If receiver 22 and transmitter 24 transmit via the same communications path, the trailing edge of the request signal occurs before the trailing falling edge at 84. If receiver 22 and transmitter 24 transmit via different communication paths, the trailing edge of the request signal can occur before or after the trailing falling edge at 84. In one embodiment, receiver 22 and transmitter 24 are electrically coupled via one conductive line and they communicate via open drain/collector transistors with pull-up resistors, where the remainder of the request signal is transmitted after the rising edge at 82 and before the falling edge at 84.

Transmitter 24 transmits data signal D1 at 74, data signal D2 at 76, and data signal D3 at 78. The length of data signal D1 at 74, from the falling edge at 84 to a falling edge at 86, is data signal time tD1 at 74. The length of data signal D2 at 76, from the falling edge at 86 to a falling edge at 88, is data signal time tD2 at 76. The length of data signal D3 at 78, from the falling edge at 88 to a falling edge at 90, is data signal time tD3 at 78. Each of the data signal times tD1 at 74, tD2 at 76, and tD3 at 78 correlates to reference time tREF at 72.

In other embodiments, synchronization signal 72 is transmitted between or after data signals, such as data signals D1 at 74, D2 at 76, and D3 at 78. The data signals received before synchronization signal 72 are stored and decoded after receiving synchronization signal 72. Also, at least a portion of the request signal overlaps in time at least a portion of the reply signal and one or more of the data signals.

Figure 4:
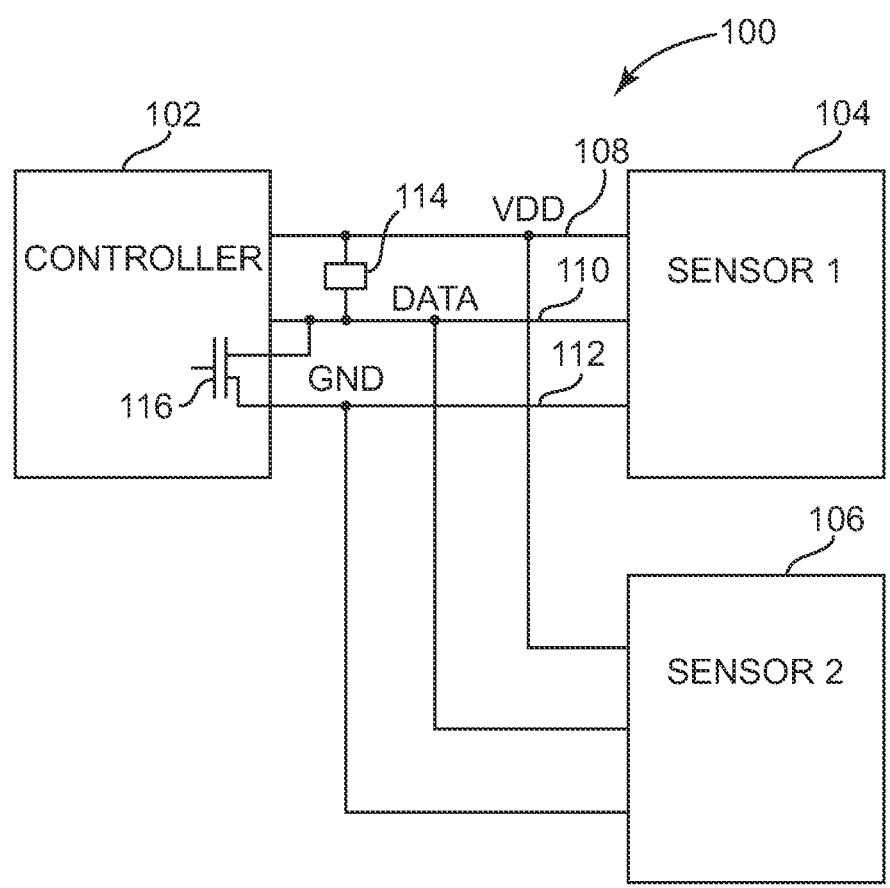
FIG. 4 is a diagram illustrating one embodiment of an electrical system that includes a controller, a first sensor, and a second sensor.

FIG. 4 is a diagram illustrating one embodiment of an electrical system 100, which includes a controller 102, a first sensor 104, and a second sensor 106. Controller 102 is electrically coupled to each of the sensors 104 and 106 via a 3-wire connection. Controller 102 is electrically coupled to first sensor 104 and second sensor 106 via VDD power supply line 108, data line 110, and a reference line, such as ground line 112. In one embodiment, system 100 is part of an automobile's electrical system. In other embodiments, controller 102 is electrically coupled to any suitable number of sensors.

Controller 102 communicates with first sensor 104 and second sensor 106 via open-drain/open-collector interfaces including one or more pull-up resistors. For example, system 100 includes pull-up resistor 114 that has a first end electrically coupled to power supply line 108 and a second end electrically coupled to data line 110, and controller 102 includes an open-drain transistor 116 that has one end of its drain-source path electrically coupled to data line 110 and the other end electrically coupled to ground line 112. Controller 102 and each of the first and second sensors 104 and 106 share a single communications path that is communicating via voltage signals on data line 110.

Controller 102 transmits a request signal that is received by the first and second sensors 104 and 106 via data line 110. The request signal includes a trigger signal and a sensor identification signal that selects one of the first and second sensors 104 and 106. In addition, the remainder of the request signal includes any other commands and/or data to be transmitted to the selected sensor, such as data request parameters such as a sensor measurement range, configurable parameters such as a relay turn-on/off time, and commands such as a self-test signal, a wake-up signal, a power down signal, a send data and remain powered-up signal, or a send data and power down signal. Controller 102 and each of the first and second sensors 104 and 106 share a single communications path such that the request signal ends before the trailing edge of the synchronization signal.

The first and second sensors 104 and 106 receive the request signal including the trigger signal and the sensor identification signal. One of the first and second sensors 104 and 106 is selected via the sensor identification signal and the selected sensor transmits a reply signal via data line 110. In one embodiment, the reply signal is similar to reply signal 70 of FIG. 3.

The reply signal includes a synchronization signal and data signals. The data signals include sensor information, such as sensor status, sensor data, and checksum information. The length of the synchronization signal provides a reference time that indicates the time base of the selected sensor. Each of the data signal lengths correlates to the reference time. In one embodiment, each of the data signals represents a nibble of data, i.e. four data bits.

The request signal and the synchronization signal overlap in time, where at least a portion of the request signal occurs at the same time as at least a portion of the synchronization signal. In response to the trigger signal, the selected sensor starts the synchronization signal and after reaching a reference count transmits the trailing falling edge of the synchronization signal to mark the end of the synchronization signal. The request signal ends before the trailing falling edge of the synchronization signal.

In one embodiment, the length of the synchronization signal is measured from the trigger signal to the trailing falling edge of the synchronization signal. In one embodiment, the selected sensor transmits a falling edge followed by a rising edge to start the synchronization signal. In one embodiment, the selected sensor transmits a high voltage value at the start of the synchronization signal and the length of the synchronization signal is measured from the trigger signal to the trailing falling edge of the synchronization signal. In one embodiment, the length of the synchronization signal is the longest pulse that can be provided via the selected sensor.

In another embodiment, a data signal is transmitted first in the reply signal, where at least a portion of the request signal occurs at the same time as at least a portion of the data signal. In response to the trigger signal, the selected sensor starts the data signal and after reaching an end count for the data signal transmits the trailing falling edge of the data signal. The request signal ends before the trailing falling edge of the data signal.

Controller 102 receives the synchronization signal and measures the length of the synchronization signal to obtain the time base of the selected sensor. Based on the received time base, controller 102 recovers data from the data signals via measuring the length of the data signals and comparing the measured length to the received time base.

In other embodiments, controller 102 transmits the request signal via VDD power supply line 108 and first and second sensors 104 and 106 transmit reply signals via data line 108.

Figure 5:
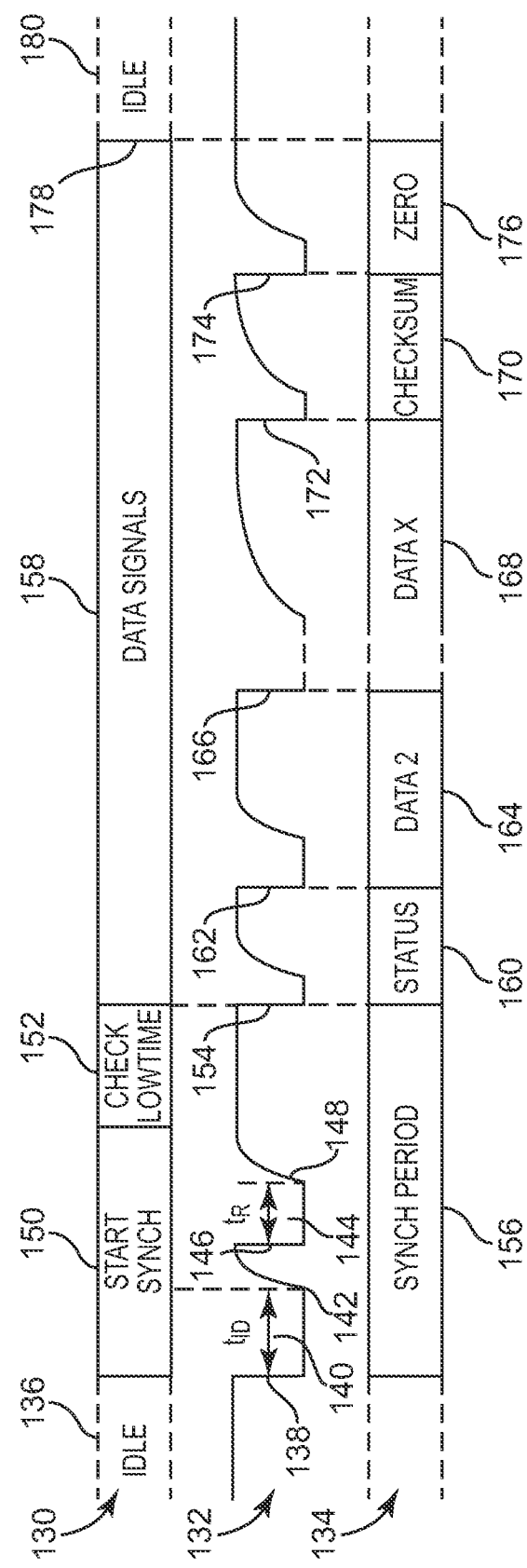
FIG. 5 is a timing diagram illustrating the operation of one embodiment of the electrical system of FIG. 4.

FIG. 5 is a timing diagram illustrating the operation of one embodiment of system 100 of FIG. 4. Controller 102 communicates with first and second sensors 104 and 106 via data line 110. In one communication sequence, controller 102 selects one of the first and second sensors 104 and 106 and the selected sensor provides sensor functions at 130. Controller 102 and the selected sensor transmit data line signal 132 via data line 110. Data line signal 132 is further described in the logical description at 134.

At 136, first and second sensors 104 and 106 are idle and controller 102 transmits a request signal that includes a trigger signal, a sensor identification signal, and a sensor range signal. The falling edge at 138 in data line signal 132 is the trigger signal. The length tID at 140 of the low voltage level following the falling edge at 138 and ending at a rising edge at 142 is the sensor identification signal. The length tR at 144 of the low voltage level from the falling edge at 146 to a rising edge at 148 is the sensor range signal.

In response to the trigger signal falling edge at 138, first and second sensors 104 and 106 start transmitting synchronization signals at 150. In one embodiment, each of the synchronization signals includes a falling edge followed by a rising edge to start the synchronization signal. In one embodiment, each of the synchronization signals includes a high voltage level at the start of the synchronization signal.

At 152, each of the first and second sensors 104 and 106 checks the low voltage level time tID at 140 of the identification signal. The selected sensor continues on to check the low voltage level time tR at 144 of the sensor range signal, which indicates the sensor range to use in data transmissions. Next, the selected sensor transmits a falling edge at 154 that ends the synchronization signal of the selected sensor and the synchronization period 156.

Controller 102 receives the falling edge at 154 of the synchronization signal and obtains the time base of the selected sensor. In one embodiment, the length of the synchronization signal is measured from the trigger signal falling edge at 138 to the trailing falling edge at 154 of the synchronization signal.

The selected sensor transmits data signals at 158, where each of the data signals has a length that indicates the bit value of the data signal. The first data signal at 160 is a status signal that indicates the status of the selected sensor. The length of the status signal at 160 begins with the falling edge at 154 and ends with a falling edge at 162. The length of the second data signal DATA2 at 164 begins with the falling edge at 162 and ends with a falling edge at 166, and so on, up to the final data signal DATAx at 168 and a checksum signal at 170. The length of the checksum signal at 170 begins with a falling edge at 172 and ends with a falling edge at 174. At 176, a zero signal begins with the falling edge at 174 and ends at a high voltage level. The data signals end at 178 and the selected sensor is idle at 180.

Controller 102 receives the data signals at 158 via data line signal 132. Controller 102 measures the length of each of the data signals 158 from one falling edge to the next falling. Based on the received time base, controller 102 recovers the data bit values of each of the data signals 158.

System 100 provides data communications between controller 102 and first and second sensors 104 and 106 via the single communications path of data line 110. The data communications have a high tolerance to time base differences between controller 102 and the first and second sensors 104 and 106. Also, the request signal and the synchronization signal provide synchronization of the data communications and the request signal provides for the transmission of commands and/or data from controller 102 to first and second sensors 104 and 106. In addition, the request signal includes sensor identification signals that provide bus ability.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A sensor, comprising:
   circuitry configured to determine if a sensor identification in a request signal received from a controller matches an assigned identification of the sensor; and
   a transmitter configured to, if the received sensor identification matches the assigned sensor identification, and in response to a trigger signal in the request signal, start to transmit a synchronization signal to the controller, and after reaching a predetermined sensor internal count value, transmit a trailing edge of the synchronization signal, wherein a length of the synchronization signal, from the trigger signal to the trailing edge, indicates a time base or clocking speed of the transmitter, and the synchronization signal indicates a communication synchronization between the controller and the transmitter.

2. The sensor of claim 1, wherein the sensor is coupled with the controller via a three-wire connection.

3. The sensor of claim 1, wherein the sensor is an automotive sensor.

4. The sensor of claim 1, wherein the response signal comprises sensor data in nibble format.

5. A system, comprising:
   a controller configured to transmit a request signal having a sensor identification; and
   a sensor configured to:
      determine if the sensor identification in the request signal matches an assigned identification of the sensor; and
      if the sensor identification in the request signal matches the assigned sensor identification of the sensor, and in response to a trigger signal in the request signal, start to transmit a synchronization signal to the controller, and after reaching a predetermined sensor internal count value, transmit a trailing edge of the synchronization signal, wherein a length of the synchronization signal, from the trigger signal to the trailing edge, indicates a time base or clocking speed of the transmitter, and the synchronization signal, and the synchronization signal indicates a communication synchronization between the controller and the transmitter.

6. The system of claim 5, wherein the controller is coupled to the sensor via a three-wire connection.

7. The system of claim 5, further comprising:
   a plurality of sensors each coupled to the controller and configured to receive the request signal having the sensor identification corresponding to one of the plurality of sensors.

8. The system of claim 7, wherein the controller is coupled to each of the plurality of sensors via a three-wire connection.

9. The system of claim 5, wherein the sensor is an automotive sensor.

10. The system of claim 5, wherein the response signal comprises sensor data in nibble format.

11. A method, comprising:
    transmitting, by a controller, a request signal having a sensor identification; and
    determining, by a sensor, if the sensor identification in the request signal matches an assigned identification of the sensor; and
    if the sensor identification in the request signal matches the assigned sensor identification of the sensor, and in response to a trigger signal in the request signal, start transmitting by the sensor a synchronization signal to the controller, and after the sensor reaches a predetermined internal count value, transmitting a trailing edge of the synchronization signal, wherein a length of the synchronization signal, from the trigger signal to the trailing edge, indicates a time base or clocking speed of the transmitter, and the synchronization signal indicates a communication synchronization between the controller and the sensor.

12. The method of claim 11, wherein the controller is coupled to the sensor via a three-wire connection.

13. The method of claim 11, further comprising:
    transmitting, by the controller, the request signal to a plurality of sensors each coupled to the controller.

14. The method of claim 13, wherein the controller is coupled to each of the plurality of sensors via a three-wire connection.

15. The method of claim 11, wherein the sensor is an automotive sensor.

16. The method of claim 11, wherein the response signal comprises sensor data in nibble format.

17. The sensor of claim 1, wherein the request signal overlaps with at least a portion of the synchronization signal.

18. The sensor of claim 17, wherein a trailing edge of the request signal occurs before the trailing edge of the synchronization signal is transmitted.

19. The system of claim 5, wherein the request signal overlaps with at least a portion of the synchronization signal.

20. The system of claim 19, wherein a trailing edge of the request signal occurs before the trailing edge of the synchronization signal is transmitted.

21. The method of claim 11, wherein the request signal overlaps with at least a portion of the synchronization signal.

22. The method of claim 21, wherein a trailing edge of the request signal occurs before the trailing edge of the synchronization signal is transmitted.

* * * * *